(12) United States Patent
Willems et al.

(10) Patent No.: US 11,553,325 B2
(45) Date of Patent: Jan. 10, 2023

(54) COMMUNICATION SYSTEM FOR MONITORING PROCESS UNITS

(71) Applicant: Robert Bosch GmbH, Stuttgart (DE)

(72) Inventors: Jan Willems, Esselbach (DE); Marco Genise, Wertheim (DE); Felix Emrich, Lohr Am Main (DE)

(73) Assignee: Robert Bosch GmbH, Stuttgart (DE)

( * ) Notice: Subject to any disclaimer, the term of this patent is extended or adjusted under 35 U.S.C. 154(b) by 271 days.

(21) Appl. No.: 17/078,408

(22) Filed: Oct. 23, 2020

(65) Prior Publication Data

US 2021/0127252 A1 Apr. 29, 2021

(30) Foreign Application Priority Data

Oct. 24, 2019 (DE) ...................... 10 2019 216 406.4

(51) Int. Cl.
*H04W 8/00* (2009.01)
*H04W 76/10* (2018.01)
*H04W 4/80* (2018.01)

(52) U.S. Cl.
CPC ........... *H04W 8/005* (2013.01); *H04W 76/10* (2018.02); *H04W 4/80* (2018.02)

(58) Field of Classification Search
None
See application file for complete search history.

(56) References Cited

U.S. PATENT DOCUMENTS

| 2015/0381737 | A1 | 12/2015 | Quinn et al. | |
| 2016/0241725 | A1* | 8/2016 | Kubota | H04W 76/14 |
| 2018/0242130 | A1* | 8/2018 | Ganton | H04W 76/00 |
| 2019/0278246 | A1* | 9/2019 | Gopisetti | G06F 11/202 |

FOREIGN PATENT DOCUMENTS

DE 10 2017 100 348 A1 7/2018

* cited by examiner

*Primary Examiner* — Robert M Morlan
(74) *Attorney, Agent, or Firm* — Maginot, Moore & Beck LLP

(57) ABSTRACT

A communication system for monitoring process units includes at least one process unit operably connected to an associated peripheral communication unit via a communication interface in order to transmit process variables to the associated peripheral communication unit. The process variables which are transmitted to the associated peripheral communication unit are configurable. Each peripheral communication unit is configured to receive the configured process variables from the corresponding process unit and to emit them as advertising packets. The communication system further includes a central communication unit configured to receive the advertising packets from each peripheral communication unit.

11 Claims, 4 Drawing Sheets

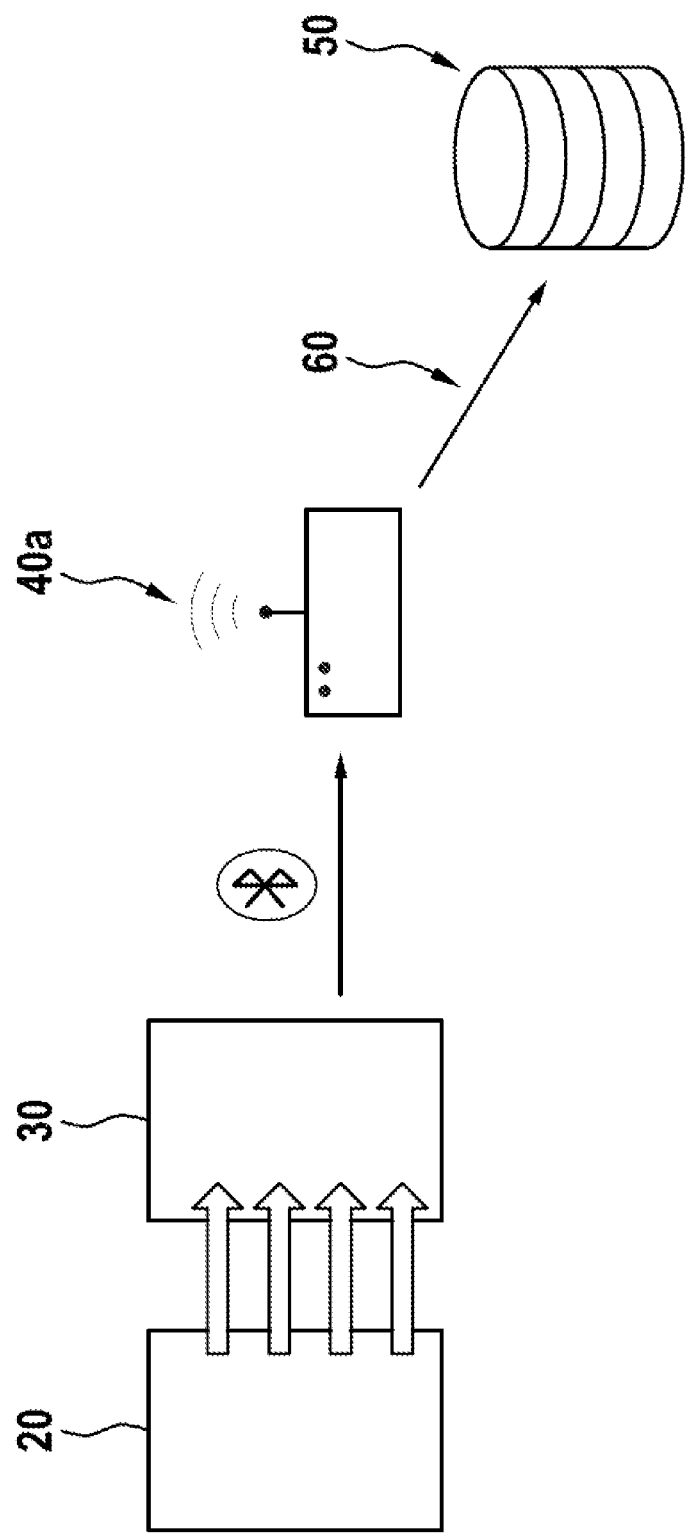

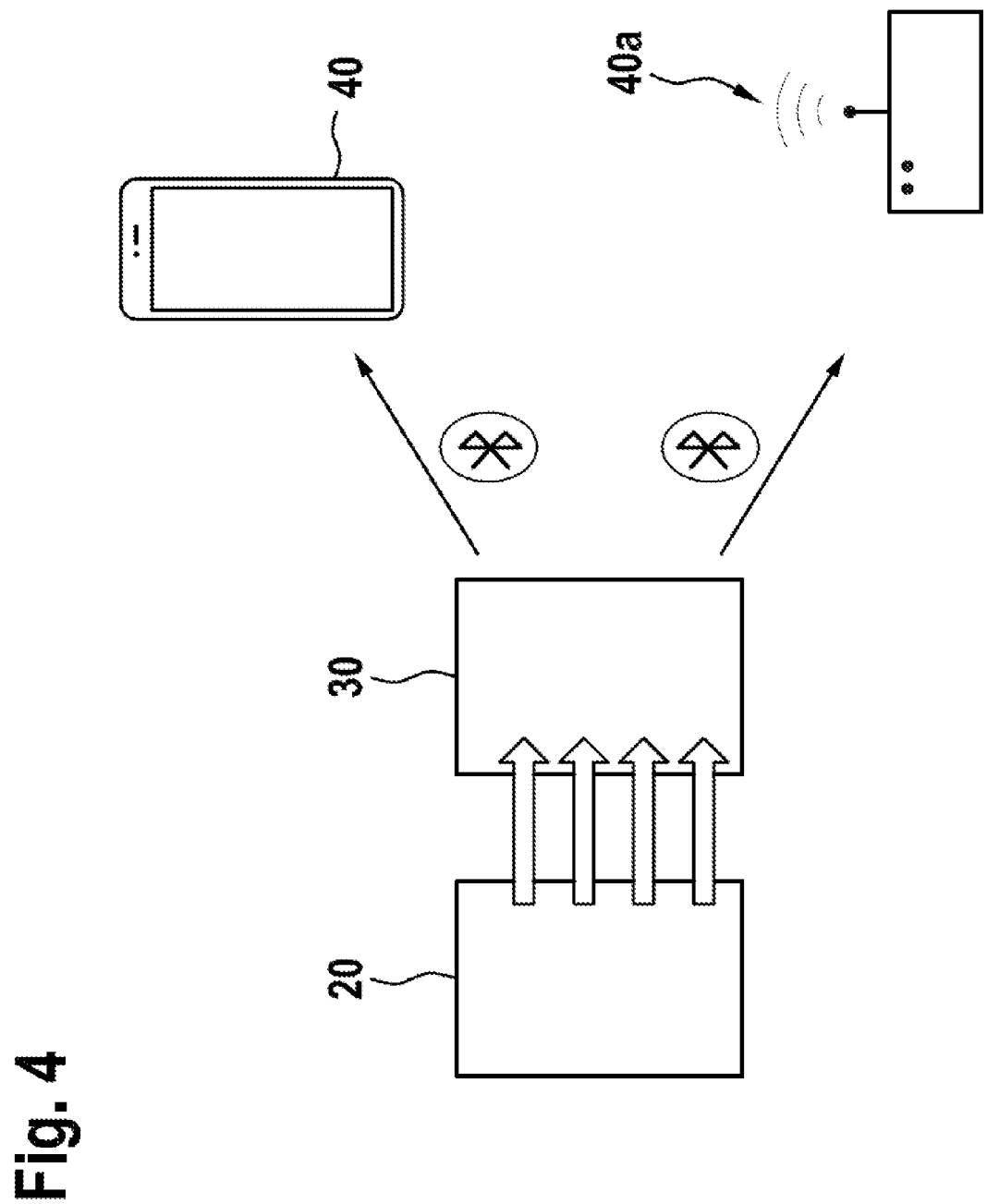

COMMUNICATION SYSTEM FOR MONITORING PROCESS UNITS

This application claims priority under 35 U.S.C. § 119 to patent application no. DE 10 2019 216 406.4, filed on Oct. 24, 2019 in Germany, the disclosure of which is incorporated herein by reference in its entirety.

The disclosure relates to a communication system for monitoring process units, wherein in particular process variables which are transmitted by a process unit to a peripheral communication unit via a communication interface, and which are emitted by said communication unit as an advertising packet, are configurable.

BACKGROUND

When using the Bluetooth Low Energy (BLE) standard, data can be transmitted or broadcast by several peripheral communication units in the form of advertising packets, independently of one another. A central communication unit receives the advertising packets without a link being necessary between the peripheral communication units and the central communication unit. However, the data which are contained in the advertising packets are predefined, such that a plurality of data, for example, all process variables of a process unit, are transmitted from the peripheral communication units to the central communication unit.

Since an advertising packet according to the Bluetooth 4 standard comprises a data quantity of only 31 bytes, it is therefore necessary to emit a plurality of advertising packets in order to transmit the plurality of data. This results in the energy consumption of the peripheral communication units being increased, which can lead to reduced operating times, in particular in the case of battery-operated peripheral communication units in which the BLE standard is preferably used as an energy-efficient radio technology. In addition, it is time-consuming for a user to filter relevant process variables from the plurality of received data, in order to draw conclusions about the state of the process unit when monitoring a process unit with the aid of such a BLE communication system. In addition, depending on the type of process unit and the nature of the application, other data are of interest for monitoring the state of the process unit.

SUMMARY

It is therefore the object of the disclosure to provide an efficient communication system which allows the user to monitor process units in a simple manner, such that said user is able to respond accordingly in the case of the occurrence of an abnormal state of one of the process units.

This object is achieved by means of the features of disclosed herein. Additional advantageous embodiments of the disclosure are specified in the subclaims.

BRIEF DESCRIPTION OF THE DRAWINGS

Embodiments of the disclosure are described below, making reference to the attached figures. The following are depicted:

FIG. 3 depicts a schematic structure of a communication system according to a second embodiment; and FIG. 4 depicts a schematic structure of a communication system according to a third embodiment.

DETAILED DESCRIPTION

First Embodiment

Figure 1:
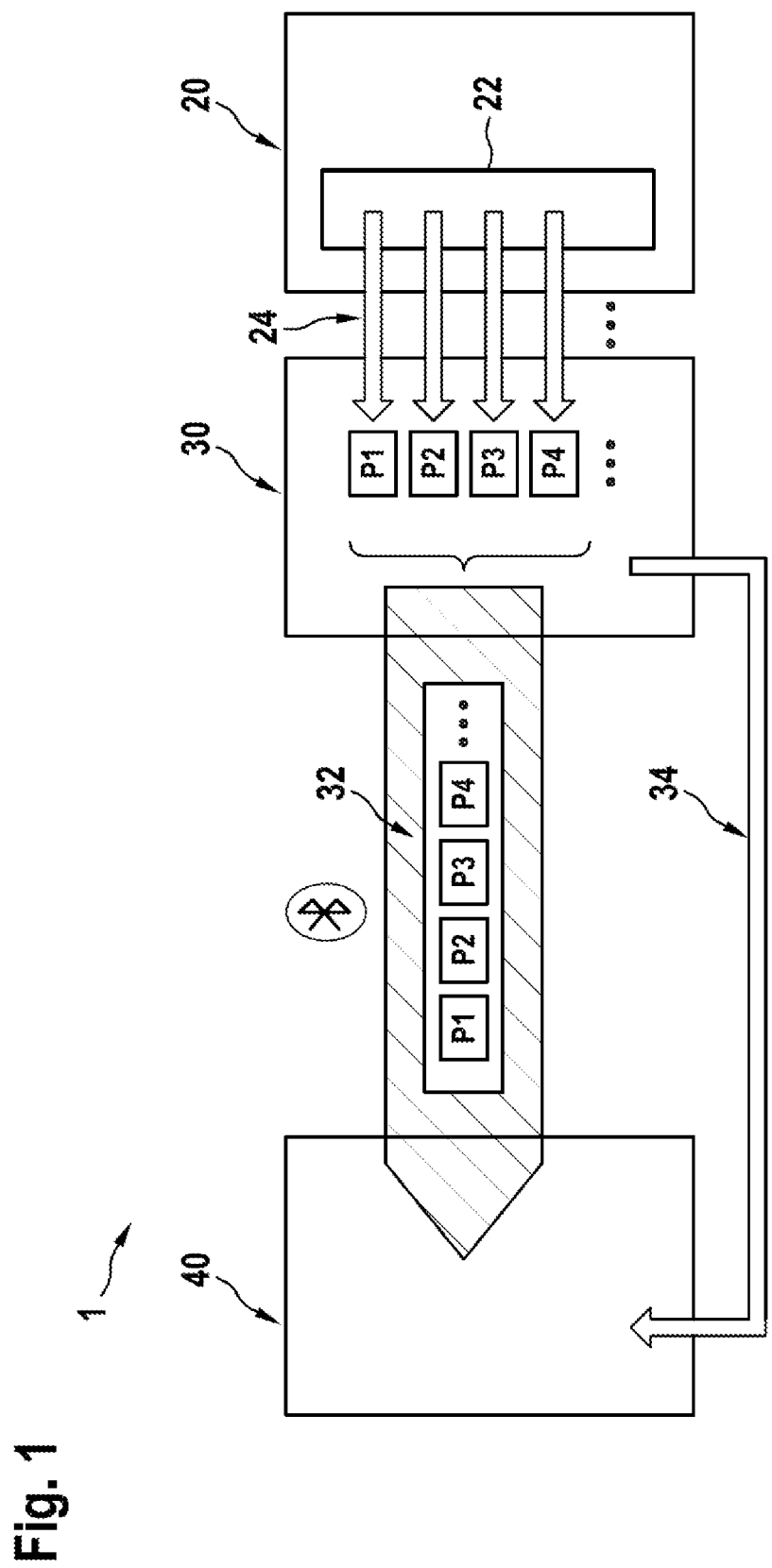
FIG. 1 depicts a schematic structure of a communication system according to a first embodiment.

FIG. 1 depicts a schematic structure of a first embodiment of a communication system 1 for monitoring process units. FIG. 1 depicts a process unit 20 by way of example, in the specific example, a valve, which is connected to an associated peripheral communication unit 30, in order to emit advertising packets 32, which are received by a central communication unit 40. However, it is self-explanatory that any number of process units which respectively comprise a peripheral communication unit can be monitored.

The process unit 20 is a component of a facility (not shown) for carrying out a process, and comprises at least one control unit 22 and a communication interface 24.

The control unit 22 is configured in such a way that it controls the operation of the process unit 20, collects a plurality of process variables P1 to P4 of the process unit 20, and is connected to the communication interface 24 for transmitting the process variables P1 to P4 to the peripheral communication unit 30. These functions of the control unit 22 are defined in firmware stored in a memory of the control unit 22. However, the control unit 22 is not limited to these functions and can also have other functions.

The control unit 22 controls or regulates the process unit 20 on the basis of the process variables P1 to P4. For this reason, the control unit 22 collects the process variables P1 to P4, as well as other process variables P1 to P4 which appear as a response to the control or regulation of the process unit 20. The control unit 22 is connected directly to sensors (not shown) for collecting the process variables P1 to P4, wherein the sensors are designed as digital and/or analog sensors which are connected to the control unit 22 in a wireless or and/or wired manner. For the case that analog sensors are used, the control unit 22 comprises an analog/digital converter in order to convert an analog input signal into a digital signal. In addition, the control unit 22 can also obtain process variables P1 to P4 from other control units of the facility, for example, via a communication connection, for example, a bus connection. Thus, several hundred process variables P1 to P4, for example, pressure, current, voltage, temperature, etc., are available to the process unit 20. In addition, limit values for the process variables P1 to P4 are defined in the firmware of the process unit 20, and are to be adhered to in order to ensure normal or error-free operation of the process unit 20. Accordingly, the control unit 22 is capable of determining a normal state or an abnormal state of the process unit 20 if a current value of one of the process variables P1 to P4 lies within or outside an operating range. If a value of one of the process variables P1 to P4 lies outside the operating range, an abnormal state of the process unit is occurring. The control unit 22 is configured in such a way that it detects an abnormal state of the process unit and generates an error message.

However, during the operation of the process unit 20, it is usually necessary that only one particular selection of process variables P1 to P4 must be situated within the operating range, such that monitoring of the remaining process variables P1 to P4 is not necessary. Therefore, the core of the disclosure is that the process variables P1 to P4, which are provided to the peripheral communication unit 30 by the control unit 22 via the communication interface 24, are configurable in the firmware of the control unit 22, such that only the relevant process variables P1 to P4 are emitted by the peripheral communication unit 30. A configuration of the process variables P1 to P4 is described in a following section. At this point, it should be pointed out that a state of a process unit 20 is also referred to below as a process variable P1 to P4. The process variables P1 to P4, which specify a state, thus enable a differentiation between a normal and an abnormal state of the process unit 20. In addition, as mentioned above, in the case of an abnormal state, an error message or an error code is generated which allows a user to identify the reason for an abnormal state of the process unit 20 in a simple manner. Within the scope of the disclosure, the entirety of these data is referred to in a simplified manner as process variables P1 to P4.

The communication interface 24 of the process unit 20 is configured in such a way that it provides the process variables P1 to P4 collected by the control unit 22 and allows access to the control unit 22. In addition, the communication interface 24 is provided by the control unit 22 itself or in another manner, for example, by means of an interface converter, etc. The communication interface 24 is a standard interface, but can also be a proprietary interface. The individual process variables P1 to P4 are provided via the communication interface 24 at a particular time interval. However, it is also conceivable that only the process variables P1 to P4 which have experienced a predefined change (for example, 2%) are provided via the communication interface 24, such that a data quantity to be transmitted is further reduced.

The communication system 1 according to the disclosure comprises the peripheral communication unit 30, which is connected to the communication interface 24. As a result, the process variables of the process unit 20 can be transmitted to the peripheral communication unit 30 and received or actively read out by said communication unit. The peripheral communication unit 30 according to the disclosure is configured in such a way that it enables data transmission according to the Bluetooth Low Energy (BLE) standard. The BLE standard makes it possible to emit or broadcast data in the form of advertising packets 32 without having to link the central communication unit 40 to the peripheral communication unit 30. The peripheral communication unit 30 is therefore configured in such a way that it reads out the process variables P1 to P4 sequentially from the communication interface 24 and emits them as advertising packets 32 at a predefined time interval. However, the peripheral communication unit 30 can also be configured in such a way that it reads out the process variables P1 to P4 in parallel and then arranges them serially in the advertising packets 32. In this case, the peripheral communication unit 30 is designed as a plug-and-play unit which can be plugged into the communication interface 24 of the process unit 20. The peripheral communication unit 30 can also be designed as an integrated component of the process unit 20 or the control unit 30.

According to the BLE standard, the advertising packet 32 has a maximum length of 31 bytes and a predefined structure. The first byte specifies the length of the following data. The second byte specifies the data type which is transmitted in the advertising packet 32. Data type values are assigned to the individual data types according to the Generic Access Profile (GAP). The following bytes specify the value of the data. However, the GAP provides only a limited number of data type values; therefore, data can also be provided as manufacturer-specific data by means of the data type value "0xFF". This manufacturer-specific data type has a slightly modified structure, such that the data transmitted thereby can be identified. The first byte again specifies the length of the following data. The second byte has the value "0xFF". The third and fourth bytes specify a company identifier code, such that a manufacturer-specific interpretation of the subsequent data is possible. These subsequent data are structured in such a way that the first byte of the data, thus the fifth byte, has an identifier (ID) which specifies the manufacturer-specific data type. Thus, for example, by means of the ID "0x01", it is possible to specify that the following bytes specify a value of the process variable P1, for example, the pressure of the process unit 20. This structure is to be used individually for each process variable P1 to P4.

An advertising packet 32 is not limited to only the value of one of the process variables P1 to P4 being transmitted per packet. Rather, the values of several process variables can be transmitted serially in an advertising packet 32, if the maximum length of 31 bytes is not exceeded. In FIG. 1, by way of example, the values of the process variables P1, P2, P3, and P4 are transmitted serially. The position of the above-described bytes of the process variables P2, P3, or P4 is accordingly shifted respectively according to the length of the previously transmitted bytes. In addition, an advertising packet 32 can also have a length less than 31 bytes.

In addition, the variable configuration of the manufacturer-specific data makes it possible also to specify an ID in such a way that data from several process variables P1 to P4 subsequently follow, arranged in series, without the structure described above being necessary for each individually process variable P1 to P4. For example, an ID "0x10" can be defined which specifies that the value of the process variable P1 and the value of the process variable P2 are subsequently transmitted. However, under this approach, it must be ensured that the length of the values for the individual process variables P1 to P4 is constant. In this way, the quantity of bytes to be transmitted in the advertising packets 32 can be further reduced.

As already described above, according to the disclosure, only a particular selection of process variables is provided by the control unit 22 of the process unit 20 for the peripheral communication unit 30 via the communication interface 24. As a result, it is not necessary for the values of all process variables P1, P2, P3, and P4 to be transmitted by the peripheral communication unit 30 in the above-described form of advertising packets 32. It is, for example, also possible that only the values of the process variables P1, P2, and P3 or the values according to another combination of the process variables P1 to P4 are emitted.

In addition, the communication system 1 according to the disclosure comprises a central communication unit 40 which is configured in such a way that it receives advertising packets 32 from the peripheral communication unit 30. According to a first embodiment, the central communication unit 40 is preferably a communication unit having a display, for example, a smartphone, a tablet, a laptop, or a desktop PC. However, the central communication unit 40 can also be a communication unit which is specifically configured for this purpose. The central communication unit 40 is also preferably a portable communication unit.

Figure 2:
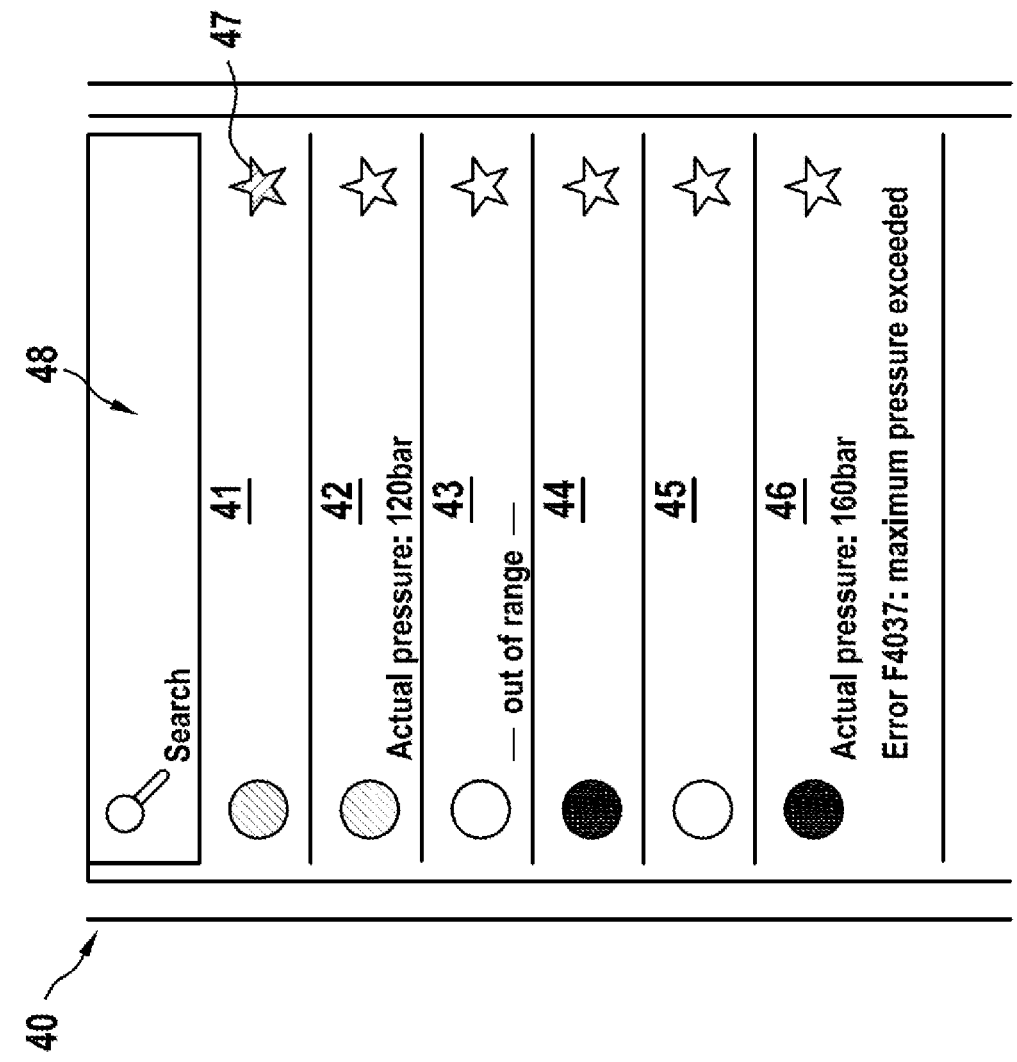
FIG. 2 depicts a user interface of a central communication unit.

FIG. 2 depicts a corresponding central communication unit 40 which collects the advertising packets 32 from several process units 41 to 46, as described above. FIG. 2 also depicts a section of a user interface which is displayed on the central communication unit 40. The central communication unit 40 is configured in such a way that it depicts the process variables P1 to P4 received via the advertising packets 32 in such a way that a user is able to identify the respective state (normal or abnormal state) of the several process components 41 to 46. The user interface is configured as an application or app on the central communication unit 40, but can also be configured in another manner, for example, as an operating system for the central communication unit 40 which is specifically programmed for this purpose.

In the depicted example, the individual process units 41 to 46 are depicted in a tabular manner, wherein the process unit 20 from FIG. 1 corresponds to the process component 46 in FIG. 2. However, it is also conceivable that the process units 41 to 46 are depicted in the form of a spatial diagram which, for example, depicts the positions of the process units 41 to 46 on a map. Since a plurality of process components 41 to 46 is normally monitored, the user interface also provides a search field 48 for searching for a process component 41 to 46 in a targeted manner.

The states of the individual process units 41 to 46 will be described below. It should be noted that the states of the individual process units 41 to 46 in FIG. 2 are depicted by a hatched circle (normal state), a filled circle (abnormal state), and an unfilled circle (no data transmission). However, other symbols, for example, colored circles, can be used, which allow a user to identify a respective state of a process component.

The process unit 41 has a normal state. As a result, all process variables are situated within the respective operating range. However, the values of the individual process variables are not emitted for the process unit 41 and are therefore also not depicted on the user interface. In addition, the process unit 41 is identified by a marking 47 as a favored process unit, which means that it is displayed in an upper section of the user interface. The process unit 42 is also in a normal state, wherein the current value of the pressure of 120 bar is also displayed. It should be pointed out that the display of the process variables is not limited to one value, but rather, values of several process variables can be displayed, for example, one below the other. The process unit 43 indicates that no values are transmitted from its peripheral communication unit to the portable unit central communication unit 40. In addition, it is indicated that the central communication unit of the process unit 43 is situated outside the transmission range of the peripheral communication unit of the process unit 43. The process unit 44 has an abnormal state, wherein no process variables are transmitted. The process unit 45 also indicates a state in which no values are transmitted from its peripheral communication unit to the portable unit central communication unit 40. However, in contrast to the process unit 43, no reason is specified for the missing communication connection. The process component 46 (the process unit 20) indicates that an abnormal state is occurring. In addition, the process component 46 indicates the occurrence of an error message "F4037", which, in the depicted example, indicates that the maximum pressure has been exceeded. In addition, the current value of the pressure of 160 bar is indicated. However, it is also possible that only one of the two process variables, an error message or a current value, is indicated.

As a result, the disclosure makes it possible for a user to identify the state of the individual process components 41 to 46 in a simple manner, without requiring the evaluation of a large amount of data.

In addition, the central communication unit 40 is configured in such a way that it establishes a connection or link between the central communication unit 40 and one of the peripheral communication units (not shown) of the process units 41 to 46. The connection is established by means of a selection operation on the central communication unit 40. For this purpose, a display of the central communication unit 40 is preferably designed as a touch display, such that the user can establish a connection with one of the peripheral units of the process units 41 to 46 by touching the place on the display at which the process component 41 to 46 is displayed. For the case that the central communication unit 40 has no touch display, the connection can also be established by means of a different selection operation, for example, by clicking with a mouse or by selecting using a joystick.

Below, it is assumed that the user establishes a connection to the peripheral unit of the process component 46, i.e., the peripheral unit 30 of the process unit 20. For this purpose, as shown in FIG. 1, a connection 34 is established, such that a Generic Attribute Profile (GATT) service is available for data transmission between the peripheral communication unit 30 and the central communication unit 40.

In addition, a user interface (not shown) which is provided by the control unit 22 of the process unit 20 and which is different from the user interface shown in FIG. 2, is displayed to the user on the display of the central communication unit 40. On this user interface of the control unit 22, the user is able to monitor all process variables of the process unit 20 and to adjust or modify process parameters of the process unit 20 in the control unit 22. Below, a process parameter is understood to mean a value, for example, an opening duration of the valve, by means of which the operation of the process unit 20 can be influenced.

Adjusting the process parameters is possible, since, after establishing the connection between the central communication unit 40 and the peripheral unit, the data transmitted to the peripheral communication unit 30 are transmitted to the control unit 22 of the process unit 20 via the communication interface 24. The user is thus able to change the process parameters in the control unit 22 of the process unit 20. In particular, the user is able to change at least one process parameter in response to an abnormal state of the process unit 20.

In addition, on the user interface, the user is able to configure the process variables P1 to P4 which are emitted as advertising packets 32 by the peripheral communication unit 30. For this purpose, the user selects the desired process variables P1 to P4, with the result that they are stored in the form of a list in the firmware of the control unit 22. In the normal case, the configuration of the process variables P1 to P4 for the process unit 20, which are to be transmitted, is carried out during the start-up of the facility. However, the configuration may also be modified at any point in time.

The list of process variables P1 to P4 to be transmitted can be compiled in various ways. On the one hand, lists may exist which are preconfigured (by the manufacturer of the process unit) and which correspond to the type of process unit 20 or the application for which the process unit 20 is provided, such that a rapid configuration is possible. On the other hand, the user can make a free configuration, wherein the configuration is stored as a new list. Of course, it is also possible for the user to store several self-configured lists in the memory of the control unit 22, in order to use then as needed. Subsequently, based on the IDs which are contained in the advertising packets 32 and which can be uniquely associated with the process variables P1 to P4, the central communication unit 40 is able to interpret the individual process variables P1 to P4 correspondingly. As already mentioned above, the process variables P1 to P4 are transmitted sequentially, wherein individual process variables P1 to P4 can be transmitted only if a predetermined modification has been made.

By means of the variable structure of the process variables P1 to P4 transmitted as advertising packets 32, it is achieved that a reduced quantity of relevant data is transmitted for a corresponding process unit. Accordingly, a more energy-efficient communication system 1 for monitoring the process unit 20 is obtained. In addition, the relevant process variables P1 to P4 can be monitored in a simple manner by a user, such that it is easily possible to identify a state. In addition, the communication system 1 according to the disclosure allows a user to establish a connection between the central communication unit 40 and the peripheral communication unit 20 of a process unit 20, in order to monitor all process variables P1 to P4 of the process unit 20, to change at least one process parameter in the control unit 22 of the process unit 20, or to change a configuration of the process variables P1 to P4 to be transmitted.

Second Embodiment

A second embodiment of the disclosure is described below, making reference to FIG. 3. It is to be noted that the configuration of the second embodiment is essentially the same as that of the first embodiment; thus, only differences with respect to the first embodiment will be described.

In the second embodiment, the process unit 20 is again provided with the peripheral communication unit 30, such that the configured process variables P1 to P4 are transmitted as advertising packets. According to the second embodiment, the central communication unit 40a is a gateway which is connected to a server 50 via a communication connection 60, for example, an Internet connection, a VPN connection, a network connection, etc. The central communication unit 40a is configured in such a way that it transmits the process variables P1 to P4 to the server. The server 50 is configured in such a way that it stores the process variables in a data memory, for example, a database or a cloud memory, etc., in order to record a history or a progression of the process variables P1 to P4 which are configured in the control unit 22 of the process unit 20.

In addition, the second embodiment provides the option of enabling a user to access the central communication unit 40 via a remote access, for example, a web service, a VPN tunnel, etc. The remote access preferably takes place by means of the central communication unit 40 according to the first embodiment, but can also take place by means of another suitable communication device. By means of the remote access, the user interface is again available to the user, as shown in FIG. 2, so that a connection can be established between the central communication unit 40a and the peripheral communication unit 30 of the process unit 20, in order to change a process parameter in the control unit 22 of the process unit 20. In this way, a user is able to change process parameters in the control unit 22 of the process unit 20 by means of the remote access. In addition, the user is able to monitor all process variables P1 to P4 of the process unit 20 via the remote access and to change the configuration of the process variables P1 to P4 which are emitted as advertising packets 32.

Furthermore, the server 50 may also be configured in such a way that it sends a message to a user if a process variable P1 to P4 is received which indicates an abnormal state of the process unit 20. For this purpose, the server 50 transmits an electronic message, for example, an email, an SMS, a push notification, etc., preferably to the central communication unit 40 according to the first embodiment. However, the server 50 can also send the electronic message to a different suitable communication unit.

The second embodiment of the disclosure thus provides the advantage that a user is informed about an abnormal state of a process unit 20 without having to monitor the process unit 20 continuously. In addition, a user can access the peripheral unit 30 of the process unit 20 via remote access, without having to be within the range of the peripheral communication unit 30 via the central communication unit 40. In addition, the process variables P1 to P4 which are configured in the control unit 22 are transmitted by the central communication unit 40a to the server 50, which is configured in such a way that it stores the process variables in a data memory, so that they are available for subsequent evaluations.

Third Embodiment

A third embodiment of the disclosure is described below, making reference to FIG. 4. It is to be noted that the configuration of the third embodiment is essentially the same as that of the first and the second embodiment; thus, only differences with respect to the first and second embodiments will be described.

According to the third embodiment, the advertising packets 32 which are emitted by the peripheral communication unit 30 are received both by the central communication unit 40 and the central communication unit 40a. This is possible since the advertising packets are emitted as a broadcast according to the BLE standard.

The third embodiment thus provides the advantage that a user is able to monitor the by the peripheral communication unit 30 of the process unit 20 as advertising packets 32 via the central communication unit 40, if said user the central communication unit 40 is within the range of the peripheral communication unit 30, without remote access having to take place via the central communication unit 40a. At the same time, the process variables P1 to P4 are transmitted to the server 50 via the central communication unit 40a in order to record the history of the process variables P1 to P4.

The communication system according to the disclosure is provided to be used in particular as a communication system in the field of industrial communication, for example, in the so-called Internet of Things (IoT), for monitoring process units making use of advertising according to the Bluetooth Low Energy Standard. However, the communication system according to the disclosure can also be used in other fields in which the content of advertising packets is to be adjustable by a user.

What is claimed is:

1. A communication system, comprising:
    at least one peripheral communication unit;
    at least one process unit operably connected to an associated peripheral communication unit of the at least one peripheral communication unit via a communication interface, the at least one process unit configured to transmit process variables to the associated peripheral communication unit, wherein the process variables are configurable, and wherein the associated peripheral communication unit is configured to receive the configured process variables from the at least one process unit and to emit the received configured process variables as advertising packets; and
    a central communication unit configured to receive the emitted advertising packets from the associated peripheral communication unit.

2. The communication system according to claim 1, wherein:

a connection is established between the central communication unit and each peripheral communication unit of the at least one peripheral communication unit, and the central communication unit is configured (i) to monitor the process variables, (ii) to adjust at least one process parameter, and/or (iii) to configure process variables which are emitted as advertising packets.

3. The communication system according to claim 2, wherein:

the central communication unit includes a user interface configured to display a state of each process unit of the at least one process unit in order to identify an abnormal state or a normal state of each process unit, and a connection is established between the central communication unit and a peripheral communication unit of the at least one peripheral communication unit indicating the abnormal state.

4. The communication system according to claim 3, wherein the connection between the central communication unit and the peripheral communication unit indicating the abnormal state is established in order to change the at least one process parameter in response to the abnormal state.

5. The communication system according to claim 2, wherein the at least one process parameter is adjusted arbitrarily.

6. The communication system according to claim 2, wherein:

the at least one process parameter is initially adjusted at a start-up of the at least one process unit, and the at least one process parameter is adjusted arbitrarily during operation of the at least one process unit.

7. The communication system according to claim 1, wherein:

the central communication unit includes at least one central communication device, and the at least one central communication device comprises a display and is operated within a range of the at least one peripheral communication unit.

8. The communication system according to claim 7, wherein:

the at least one central communication device is a gateway connected to a server, and the server is configured to store the process variables emitted as advertising packets in a data memory.

9. The communication system according to claim 8, wherein the server is configured to send an electronic message to the central communication unit when an abnormal state of the at least one process unit occurs.

10. The communication system according to claim 9, wherein:

remote access is established to another communication unit by the central communication unit, and the central communication unit is configured (i) to monitor the process variables, (ii) to adjust at least one process parameter, and/or (iii) to configure the process variables which are emitted as advertising packets.

11. The communication system according to claim 1, wherein several communication devices receive the process variables emitted as advertising packets by the associated peripheral communication unit, when no connection is established between one of the central communication unit and the associated peripheral communication unit.

* * * * *